Figure 1:
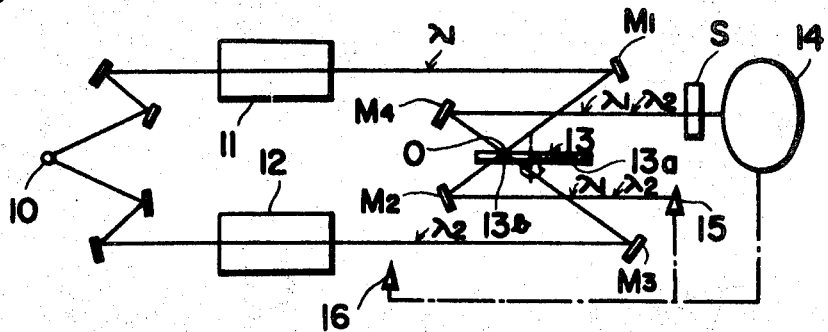

United States Patent [19]
Yamamoto

[11] 3,712,738
[45] Jan. 23, 1973

[54] ILLUMINATOR SYSTEM FOR USE IN SPECTROPHOTOMETER

[75] Inventor: Hiroshi Yamamoto, Kyoto, Japan

[73] Assignee: Shimadzu Seisakusho Ltd., Kyoto Japan

[22] Filed: March 10, 1971

[21] Appl. No.: 122,883

[52] U.S. Cl. .................356/93, 356/74, 356/94, 356/97
[51] Int. Cl. ................................G01j 3/42
[58] Field of Search..........356/74, 88, 92, 93, 94, 95, 356/101

[56] References Cited

UNITED STATES PATENTS

| | | | |
|---|---|---|---|
| 2,503,165 | 4/1950 | Meyer | 356/93 |
| 3,449,050 | 6/1969 | Keahl | 356/95 |

OTHER PUBLICATIONS

Compensation for Light Source Noise in a Sensitive Dual Wavelength Spectrophotometer, Chance et al.; Review of Scientific Instruments; Vol. 41 No. 1; January, 1970; pg. 111–115

*Primary Examiner*—Ronald L. Wibert
*Assistant Examiner*—V. P. McGraw
*Attorney*—Craig, Antonelli, Stewart & Hill

[57] ABSTRACT

An illuminator system for use in a spectrophotometer by which the mode of operation can be easily changed in a simple manner. To this end, means for shielding either of the beams emerged from respective monochromatic beam generators and means for shielding, when said first mentioned means is in the inoperative condition, the other of said beams that has passed through the sector diaphragm. By operating the above mentioned two means, the double wavelength, single beam spectrophotometer can be used as a single wavelength dual beam spectrophotometer and vice versa.

8 Claims, 7 Drawing Figures

INVENTOR

HIROSHI YAMAMOTO

BY Craig, Antonelli, Stewart & Hill
ATTORNEYS

INVENTOR

HIROSHI YAMAMOTO

ILLUMINATOR SYSTEM FOR USE IN SPECTROPHOTOMETER

The present invention relates to an improvement in a spectrophotometer and, more particularly, to an illuminator system for use in such spectrophotometer as referred to by which the spectrophotometer can be selectively employed as a dual wavelength, single beam spectrophotometer and a single wavelength, dual beam spectrophotometer.

It has been well known that an exemplary type of dual wavelength, single beam spectrophotometer heretofore largely employed can be switched over to function as a single wavelength, dual beam spectrophotometer as desired. In this connection, various methods and means for changing the mode of operation of a spectrophotometer have heretofore been proposed.

As is well known in the art, the dual wavelength, single beam spectrophotometer in general comprises a pair of monochromatic beam generators, for example, monochromators or filters, for producing respective beams of light of different wavelengths and an optical system for guiding these two beams on to a single optical path which is in alignment with a sample container in which material to be analyzed is contained. In this instance, if the dual wavelength, single beam spectrophotometer is to be used as a single wavelength, dual beam spectrophotometer by changing the mode of operation, these two monochromatic beam generators should be individually adjusted to produce two monochromatic beams of the same wavelength by means of suitable methods, such as rotating respective diffraction gratings, these monochromatic beams of the same wavelength being in turn transmitted along respective optical paths, which are parallel to each other, to a single detector device through a pair of sample containers, one for analysis and the other for reference purpose, respectively.

However, in the dual wavelength, single beam spectrophotometer as hereinabove referred to, since it is very difficult to obtain the same performance characteristics the two monochromatic beam generators, the two monochromatic beams thus produced often tend to have different light intensities even though the wavelengths of these two monochromatic beams can be adjusted to be of the same value. This results, for example, from the anomaly of light dispersing elements such as diffraction gratings or different refractive characteristics of such light dispersing elements.

If the intensities of light transmitted through the reference sample container and the analysis sample container, respectively, are different from each other even though the wavelengths thereof are of the same value, a difficulty will arise as to the determination of the level representative of the maximum value of transmission factor with respect to either of these beams.

In addition, in order to maintain at the same wavelength the two beams produced through respective monochromatic beam generators, a mechanically complicated device to change the mode of operation of the dual wavelength, single beam spectrophotometer has been required.

Accordingly, an essential object of the present invention is to provide an illuminator system for use in a spectrophotometer in which change of the mode of operation thereof can be facilitated in a simple and easy manner.

Another object of the present invention is to provide a slit illuminator system which can be employed in either a dual wavelength, single beam spectrophotometer or a single wavelength, dual beam spectrophotometer so that the mode of operation can be easily changed from one to the other.

A further object of the present invention is to provide a slit illuminator system for use in a spectrophotometer wherein means for selectively changing the mode of operation thereof comprises a small number of light shielding elements thereby to facilitate the manufacture thereof at low cost.

Figure 2:
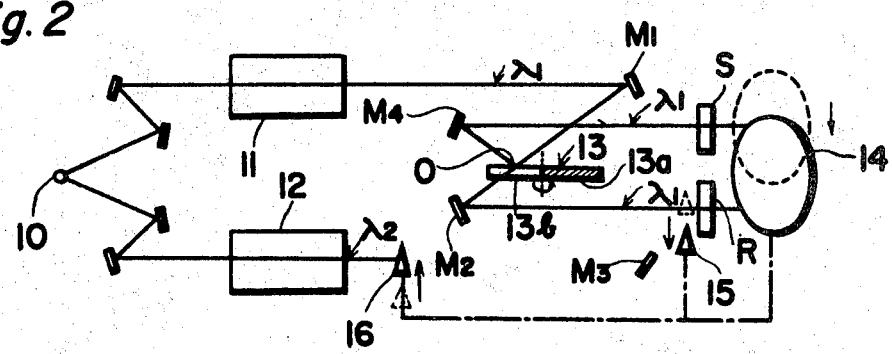
Figure 3:
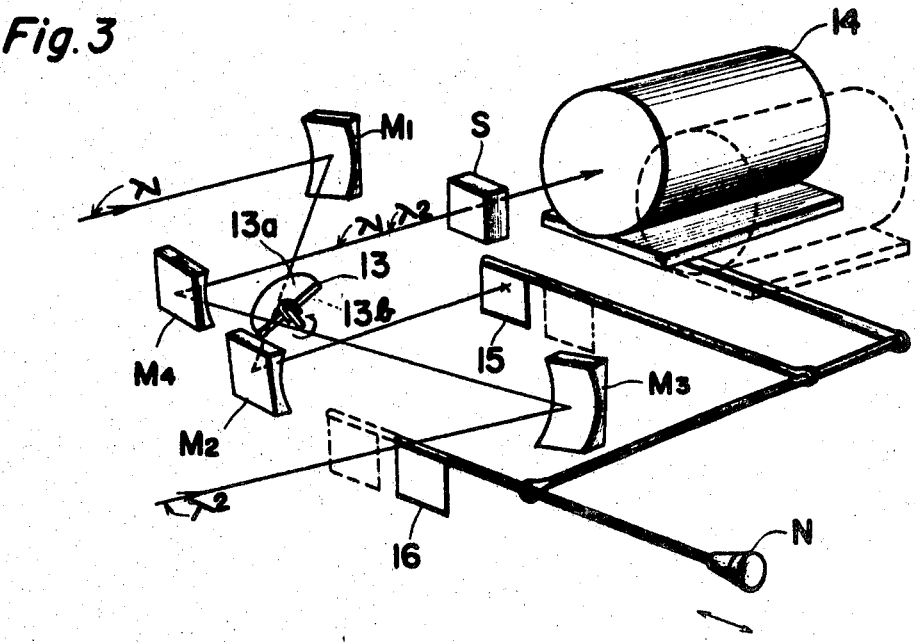
Figure 4:
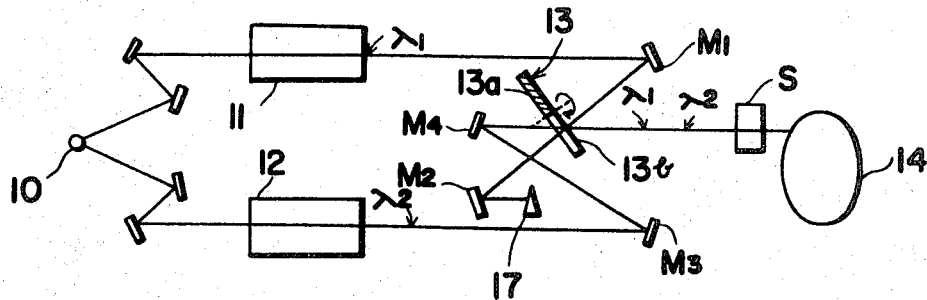
Figure 5:
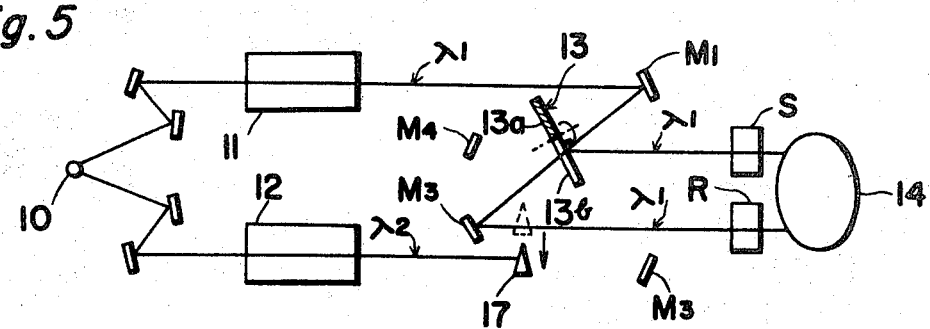
Figure 6:
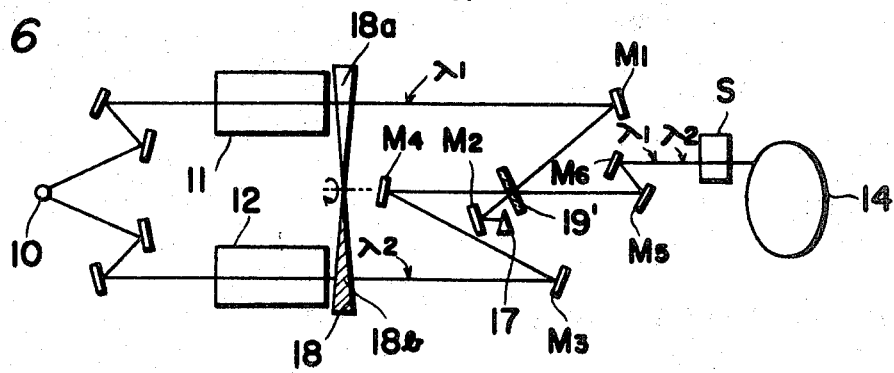
Figure 7:
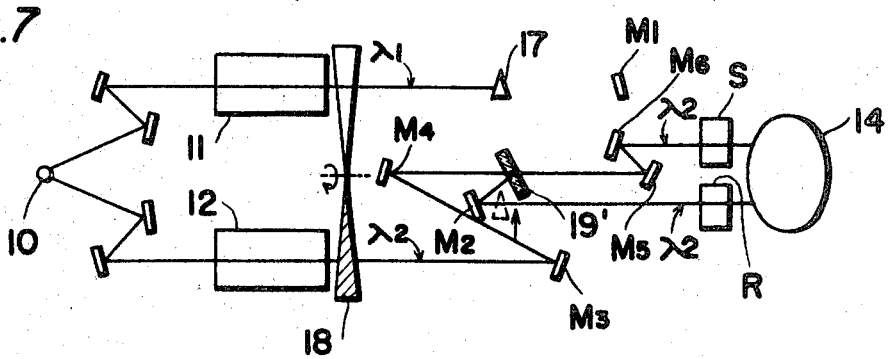

These and other objects and features of the present invention will become apparent from the following description taken only for the purpose of illustration thereof in conjunction with preferred embodiments shown in the accompanying drawings, in which;

FIG. 1 is a schematic diagram showing an illuminator system for use in a spectrophotometer in one embodiment, said spectrophotometer being in the condition in which it is used as a dual wavelength, single beam device, FIG. 2 is a schematic diagram similar to FIG. 1 showing said spectrophotometer being in the condition in which it is used as a single wavelength, dual beam device, FIG. 3 is a schematic perspective diagram of an essential portion of the illuminator system shown in either of FIGS. 1 and 2, FIG. 4 is a schematic diagram showing an illuminator system for use in a spectrophotometer in another embodiment, said spectrophotometer being in the condition in which it is used as a dual wavelength, single beam device, FIG. 5 is a schematic diagram similar to FIG. 4 showing said spectrophotometer being in the condition in which it is used as a single wavelength, dual beam device, FIG. 6 is a schematic diagram showing an illuminator system for use in a spectrophotometer in a further embodiment, said spectrophotometer being in the condition in which it is used as a dual wavelength, single beam device, and FIG. 7 is a schematic diagram similar to FIG. 6 showing said spectrophotometer being in the condition in which it is used as a single wavelength, dual beam device.

Before the description of the present invention proceeds, it is to be noted that like parts are designated by like reference characters throughout the accompanying drawings. It is further to be noted that the description of the present invention will proceeds in connection with the dual wavelength, single beam spectrophotometer to which the illuminator system according to the present invention is applied.

The illuminator system for use in the dual wavelength, single beam spectrophotometer according to the present invention shown in the accompanying drawings generally comprises a suitable light source 10 and respective pairs of light transmission elements disposed between said light source 10 and a pair of monochromatic beam generators 11 and 12, such as monochromators, for transmitting rays of light from the light source 10 to the respective monochromatic beam generators 11 and 12. These monochromatic beam generators 11 and 12 may be of the same construction, but should be such that, for example, while one of the beam generators 11 is effective to emit a beam of light of given wavelength $\lambda_1$, the remaining beam generator 12 is effective to emit a beam of light of wavelength $\lambda_2$ adjacent to the given wavelength $\lambda_1$ and capable of giving substantially the same intensity of light as given by the given wavelength $\lambda_1$ when scattered from the sample to be analyzed.

The both beams $\lambda_1$ and $\lambda_2$ respectively emitted from the beam generators 11 and 12 and adapted to be transmitted to a sector diaphragm 13 which is constantly rotated about its own axis of rotation while the spectrophotometer is in use. To this end, a plurality of optically reflective elements, such as mirrors are disposed on individual optical paths for the respective beams between the beam generators 11 and 12 to a single detector 14 which comprises a photomultiplier tube connected with a suitable electric circuit known to those skilled in the art.

The sector diaphragm 13 is, when rotated, adapted to give a pulsating characteristic to either of the beams $\lambda_1$ and $\lambda_2$ to be transmitted to the detector 14 and is formed in the instance as shown with alternate reflective and open portions as indicated by 13a and 13b. However, the details of structure of this sector diaphragm 13 is well known in the art and, therefore, is herein omitted.

Referring now to FIG. 1 through FIG. 3 with the above description in mind, the optically reflective elements disposed on individual optical paths for the beams $\lambda_1$ and $\lambda_2$ between the monochromatic beam generators 11 and 12 to the detector 14 as hereinbefore referred to includes a pair of mirrors $M_1$ and $M_2$ on the optical path for the beam $\lambda_1$ and a pair of mirror $M_3$ and $M_4$ on the optical path for the beam $\lambda_2$.

The mirrors $M_1$ and $M_3$ are arranged such that the beam $\lambda_1$ derived from the beam generator 11 and reflected by the mirror $M_1$ and the beam $\lambda_2$ derived from the beam generator 12 and reflected by the mirror $M_3$ intersect each other at a point 0 on one surface of the sector diaphragm 13 at which either of the reflective or open portions 13a and 13b of the diaphragm 13 is positioned so as to alternatively permit the beams $\lambda_1$ and $\lambda_2$ to respectively pass therethrough on to the mirrors $M_2$ and $M_4$ and to be respectively reflected therethrough on to the mirrors $M_4$ and $M_2$.

Either of the beams $\lambda_1$ and $\lambda_2$ reflected by the corresponding mirror $M_2$ or $M_4$ depending upon the rotation of the sector diaphragm 13 is adapted to be transmitted toward the detector 14, the details of which will be hereinafter fully described in connection with the mode of operation of the illuminator system of the present invention.

Particularly referring to FIG. 1 or FIG. 3, it is shown that the illuminator system according to the present invention is in position to permit the double beam spectrophotometer to function as such. In this case, both beams $\lambda_1$ and $\lambda_2$ are utilized to effect the spectrophotometric measurement subject to material contained in the sample container S. In other words, while the sector diaphragm 13 is continuously rotated about its own axis of rotation, both beams $\lambda_1$ and $\lambda_2$ follows travel on the same optical path between the mirror $M_4$ and the detector 14 in such a manner that both beams are alternatively transmitted at regular intervals which are determined by the rotational speed of the sector diaphragm 13. This can be achieved because the beam $\lambda_1$ reflected by the mirror $M_1$ travels to the mirror $M_2$ through the sector diaphragm 13 at one time while the beam $\lambda_2$ reflected by the mirror $M_3$ travels to the mirror $M_4$ therethrough and, at the other time, the beam $\lambda_1$ is reflected by the sector diaphragm 13 on to the mirror $M_4$ while the beam $\lambda_2$ reflected by the mirror $M_3$ travels to the mirror $M_2$ therethrough. This mode of operation is well known in the art.

However, according to the present invention, means for shielding either of the beams from being transmitted to the detector 14 is provided as a pair of drivingly associated diaphragms 15 and 16, one of which 15 is, in the example shown in FIG. 1 and FIG. 3, employed to shield one composite beam formed by both beams $\lambda_1$ and $\lambda_2$ and the other of which 16 is positioned completely off the optical path between the beam generator 12 and the mirror $M_3$.

As shown in FIG. 2, when the illuminator system according to the present invention is in position to permit the dual wavelength, single beam spectrophotometer to function as a single wavelength, dual beam device, the above mentioned shielding means is positioned such that the diaphragm 15 is disposed off the optical path connecting the mirror $M_2$ and the detector 14 while the diaphragm 16 is in position to shield the optical path connecting the generator 12 and the mirror $M_3$. While in this condition, only the beam $\lambda_1$ emerging from the beam generator 11 is employed to effect the spectrophotometric measurement subject to the material contained in the sample container S and an empty reference container R of the same construction as that of the sample container S. Of course, the same beam $\lambda_1$ is applied to the detector 14 through both sample containers S and R in a pulsating manner, but along different optical paths.

In the embodiment shown in FIG. 1 through FIG. 3, the detector 14 is adapted to be displaced from the position shown in FIG. 1 to the position shown in FIG. 2 in connection with the pair of drivingly associated diaphragms 15 and 16. However, if the detector 14 is employed in the form of a photomultiplier tube of end-on type having a relatively large photosensitive area, no displacement of the detector 14 may be effected. Nevertheless, so long as the photomultiplier tube of ordinary type is employed for the detector 14, both detector 14 and the pair of diaphragms 15 and 16 may be connected by a link mechanism as shown in FIG. 3 wherein, if a knob N is operated, the conditions shown in FIG. 1 and FIG. 2 can be selectively determined. In this regard, any means for conjointly moving detector 14 and the diaphragms 15 and 16 will satisfy the requirements of the present invention.

In another preferred embodiment of the present invention shown in FIG. 4 and FIG. 5, only diaphragm 17 is employed for the shielding means, which has been described as comprising a pair of associated diaphragms 15 and 16 in the foregoing embodiment. As can be well understood from FIG. 4 and FIG. 5, it is apparent that, only by moving the diaphragm 17 in the direction as indicated by the arrow, the mode of operation of the illuminator system can be selectively changed.

In addition, in this embodiment, the sector diaphragm 13 is positioned so that either of the reflective and open portions 13a and 13b thereof coincides with the optical path between the mirrors $M_1$ and $M_3$. By this arrangement, the number of reflections of either of the beams $\lambda_1$ and $\lambda_2$ when the composite beam is to be formed can be substantially equalized to that of the other.

In operation, if the diaphragm 17 is positioned as illustrated in FIG. 4, the detector 14 acts to detect the composite beam formed by both beams $\lambda_1$ and $\lambda_2$ and transmitted along a single optical path through the sample container S. However, if the diaphragm 17 is displaced so as to shield the optical path between the beam generator 12 and the mirror $M_3$ and open the optical path between the mirror $M_2$ and the detector 14 through the reference container R, then the illuminator system is optically in the condition as shown in FIG. 5 to permit the dual wavelength, single beam spectrophotometer to function as a single wavelength, dual beam device.

In either of these embodiments as hereinbefore described, the sector diaphragm 13 for producing the composite beam when the dual wavelength, single beam spectrophotometer is desired to function as such and for producing pulsating beams to be transmitted to the detector 14 through respective sample container S and reference container R has been employed. However, instead of this sector diaphragm 13, a combination of a chopper means and a semi-transparent mirror may be employed which is shown in FIG. 6 and FIG. 7 as the other preferred embodiment of the present invention.

Referring now to FIG. 6 and FIG. 7, means for producing the composite beam when the dual wavelength, single beam spectrophotometer is desired to function as such and for producing pulsating beams to be transmitted to the detector 14 through respective sample and reference containers S and R when the dual wavelength, single beam spectrophotometer is desired to function as a dual wavelength, single in cooperation with the shielding means comprises a chopper 18 having a pair of open and shielding segments 18a and 18b and a semi-transparent mirror 19 rigidly disposed at the same position as the sector diaphragm 13 shown in FIG. 4 and FIG. 5 so that it acts to permit the beams to reflect thereon or pass therethrough substantially in the same manner as in the embodiment shown in FIG. 4 and FIG. 5. However, instead of the reflective and open segments 18a and 18b of the sector diaphragm, the chopper 18 is disposed so as to rotate about its own axis of rotation whereby the optical paths between the beam generator 11 and the mirror $M_1$ and between the beam generator 12 and the mirror $M_3$ can be alternatively shielded at regular intervals which are determined by the rotational speed of the chopper 18. Accordingly, it will be clearly understood that, when the dual wavelength, single beam spectrophotometer is desired to function as such, the combination of the chopper 18 and the semi-transparent mirror 19 can produce the composite beam which is transmitted to the detector 14 through the sample container S. On the other hand, if the dual wavelength, single beam spectrophotometer is desired to function as a single wavelength, dual beam device, the combination can also produce the pulsating beams to be transmitted to the detector 14 through respective sample and reference containers S and R.

It is to be noted that, in this embodiment shown in FIG. 6 and FIG. 7, the shielding diaphragm 17 is adapted to shield the optical path between the beam generator 11 and the mirror $M_1$ when the dual wavelength, single beam spectrophotometer is desired to function as a single wavelength, dual beam device as shown in FIG. 7. In addition, a pair of mirrors $M_5$ and $M_6$ are additionally provided on the optical path between the semitransparent mirror 19 and the detector 14 so that the number of reflections of the beam $\lambda_1$ can be equalized to that of the beam $\lambda_2$ when the composite beam is to be formed for imparting the same quality to both beams included in the composite beam. Even when the dual wavelength, single beam spectrophotometer is used as a single wavelength, dual beam as shown in FIG. 7, the provision of the mirror $M_5$ and $M_6$ is effective to equalize the reflection of a portion of either of the beams adapted to be transmitted through the sample container S to the reflection of the remaining portion of the same beam adapted to be transmitted through the reference container R, both portions of said beam being divided by said semi-transparent mirror 19.

Although the present invention has been fully disclosed by way of example wherein the illuminator system is employed in a dual wavelength, single beam spectrophotometer for enabling the later to concurrently function as a single wavelength, dual beam device, it is to be noted that the reverse can be applicable without any modification. In addition, particularly in the first mentioned embodiment, the provision of the diaphragm 15 may be omitted to effect the spectrophotometric measurement subject to a plurality of, say, a pair of sample containers in which the same or different material to be analyzed is respectively contained. Furthermore, for the purpose known by those skilled in the art, the beam generators 11 and 12 herein employed may be designed such that the beams of the same wavelength can be respectively produced.

What is claimed is:

1. An illuminator system for use in a spectrophotometer comprising a source of light, a pair of first and second beam generators effective to produce first and second monochromatic beams of different wavelength when rays of light from said light source are passed therethrough, respectively, a plurality of mirrors disposed so as to guide the first and second beams toward a photosensitive area of a photodetector, means for shielding either of said first and second beams, and means for producing a composite beams formed with said first and second beams in an alternate manner at regular intervals when said first mentioned means is in position to shield neither of said first and second beams and for giving a pulsating characteristic to the other of said first and second beams when said first mentioned means is in position to shield either of the first and second beams.

2. An illuminator system according to claim 1, wherein said first beam has a wavelength proximate to that of said second beam to an extent that either of said beams can give substantially the same scattered light intensity as given by the other beam.

3. An illuminator system according to claim 1, wherein the number of said mirrors is such that the number of reflections of either of said beams while it travels between the corresponding beam generator to the photodetector is substantially equal to that of the other.

4. An illuminator system according to claim 1, wherein said second mentioned means comprises a sector diaphragm rotatable about its own axis of rotation and having open and reflective segments.

5. An illuminator system according to claim 1, wherein said second mentioned means comprises a chopper rotatable about its own axis of rotation for alternatively shuttering the first and second beams emerging from the respective first and second beam generators and a semitransparent mirror.

6. An illuminator system for use in a spectrophotometer comprising a source of light, a pair of first and second beam generators effective to produce first and second monochromatic beams of different wavelengths when rays of light from said light source are passed therethrough, respectively, a plurality of mirrors disposed so as to guide the both first and second beams in the parallel relation to each other toward a single photosensitive area of a photodetector, means for shielding either of said first and second beams, means for producing a composite beams formed with said first and second beams in an alternate manner at regular intervals when said first mentioned means is in position to shield neither of said first and second beams and for giving a pulsating characteristic to the other of said first and second beams when said first mentioned means is in position to shield said either of the first and second beams, and means for shielding, when said first mentioned means is in position to shield neither of said first and second beams, the other of said beams that has passed through said second mentioned means.

7. An illuminator system according to claim 6, wherein said first mentioned means and said third mentioned means are constructed with a single diaphragm.

8. An illuminator system according to claim 6, wherein said first and third mentioned means and the photodetector are drivingly associated to facilitate the change of the mode of operation.

* * * * *